Patented Nov. 14, 1950

2,530,202

UNITED STATES PATENT OFFICE 2,530,202

HALOGENOHYDROCARBON DERIVATIVES OF SILANES

Charles F. Kohl, Jr., Pittsburgh, Pa., assignor to Dow Corning Corporation, Midland, Mich., a corporation of Michigan No Drawing. Application December 2, 1949, Serial No. 130,856

4 Claims. (Cl. 260—448.2)

The present invention relates to chloromethylsilanes which contain at least one trifluoromethyl substituted phenyl radical.

The trifluoromethylphenylsilanes, even those which contain a chlorine bonded to silicon, are relatively nonreactive as contracted with other chlorosilanes, particularly with respect to polymer formation.

Objects of the present invention are the provision of trifluoromethyl substituted phenylsilanes which have at least one chloromethyl radical bonded to silicon. The chloromethyl radicals bonded to silicon are reactive and may be employed as the reactive substituents for the formation of derivatives. By this group on the silicon, the trifluoromethyl substituted phenylsilane may be interpolymerized to obtain resins and stable fluids of enhanced properties.

Compounds in accordance herewith are of the following general formula:

where $n$ represents a positive integer less than 3, $a$ represents an integer from 1 to 2, $b$ has a whole value from 0 to 1, $c$ has a whole value from 0 to 2, and $a+b+c$ equals 3.

Thus, the compounds hereof are of the following four types, in which R is employed to represent the above trifluoromethyl substituted phenyl radical.

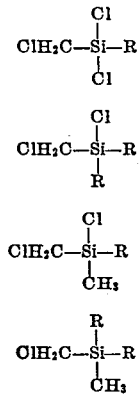

The compounds hereof may be prepared by the interaction of a trifluoromethyl substituted phenyl Grignard reagent with a chloromethylchlorosilane. Suitable chloro-methylchlorosilanes include chloromethyltrichlorosilane, chloromethylmethyldichlorosilane, and the like.

The products hereof which have chlorine bonded to silicon may be hydrolyzed and condensed to form siloxanes and may be cocondensed with other chlorosilane hydrolysis products to form siloxane copolymers of typical organosiloxane copolymer utility, such as hydraulic fluids, lubricants, and the like.

The fourth above type may itself be employed as a low viscosity lubricant.

Example 1

The Grignard reagent of trifluorotolylbromide was prepared in accordance with the method described in British Specification 29139/48, which was available for public inspection on May 17, 1949, which specification corresponds to my U. S. application, Serial No. 786,541, filed November 17, 1947. Two gram moles of the Grignard reagent in either solution were added to three gram moles of chloromethyltrichlorosilane at room temperature. The reaction product was heated under reflux for a day. The reaction product was filtered to remove the by-produced salt and strip distilled to remove the ether. The residue was fractionally distilled. Two products were obtained as follows: (trifluorotolyl) (chloromethyl) dichlorosilane which had a boiling point of 86° C. at 3.6 mm. mercury, an index of refraction at 25° C. of 1.4839, a density at 25° C. of 1.4663, and a specific refraction of 0.19508. The second product was bis(trifluorotolyl) (chloromethyl) chlorosilane which had a boiling point of 152° C. at 3.5 mm. mercury, an index of refraction of 25° C. of 1.4987, a density at 25° C. of 1.4407, and a specific refraction of 0.20370.

Example 2

Two gram moles of (chloromethyl) methyldichlorosilane were added to two gram moles of the Grignard reagent described in Example 1. The reaction went with sufficient ease that exothermic heat of reaction was observed due to the warming of the reactor. Following addition of all of the silane, the reaction product was filtered to remove the salt, strip distilled to remove the ether, and fractionally distilled under vacuum. Two products were obtained as follows: (chloromethyl) (trifluorotolyl) methylchlorosilane which had a boiling point of 130.8° C. at 25 mm., an index of refraction at 25° C. of 1.4796, a density at 25° C. of 1.3411, and a specific refraction of 0.21168; and (chloromethyl) bis(trifluorotolyl) methylsilane which had a boiling point of 130.8° to 131.8° C. at 1.5 mm. mercury, an index of refraction at 25° C. of 1.4925, a density at 25° C. of 1.3434, and a specific refraction of 0.21944.

*Example 3*

By use of the equivalent Grignard reagent prepared from hexafluoroxylyl bromide in accordance with the method described in my copending application supra corresponding hexafluoroxylylsilanes to those described in Examples 1 and 2 may be prepared.

The specific refraction referred to above may be compared with theoretical bond refractions computed in accordance with the method described by E. L. Warrick, Journal of the American Chemical Society, volume 68 (1946), page 2455.

That which is claimed is:

1. Compositions of the general formula:

where $n$ represents a positive integer less than 3, $a$ represents an integer from 1 to 2, $b$ has a whole value from 0 to 1, $c$ has a whole value from 0 to 2, and $a+b+c$ equals 3.

2. 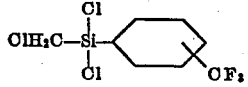

3. 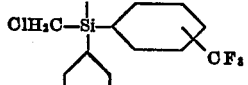

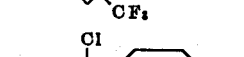

4. 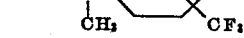

CHARLES F. KOHL, Jr.

No references cited.

Certificate of Correction

Patent No. 2,530,202                                              November 14, 1950

CHARLES F. KOHL, Jr.

It is hereby certified that error appears in the printed specification of the above numbered patent requiring correction as follows:

Column 2, line 19, for the word "either" read *ether*; line 34, for "of 25°" read *at 25°*;

and that the said Letters Patent should be read as corrected above, so that the same may conform to the record of the case in the Patent Office.

Signed and sealed this 23rd day of January, A. D. 1951.

[SEAL]

THOMAS F. MURPHY,
*Assistant Commissioner of Patents.*